United States Patent [19]
Kazita et al.

[11] Patent Number: 5,314,341
[45] Date of Patent: May 24, 1994

[54] ELECTRICAL CONNECTOR DEVICE

[75] Inventors: Hidenobu Kazita, Okazaki; Toshinobu Nishi, Oobu, both of Japan

[73] Assignee: Nippondenso Co., Ltd., Kariya, Japan

[21] Appl. No.: 6,534

[22] Filed: Jan. 21, 1993

[30] Foreign Application Priority Data

Jan. 21, 1992 [JP] Japan .................................. 4-008612

[51] Int. Cl.⁵ ............................................ H01R 39/02
[52] U.S. Cl. ........................................ 439/15; 439/164
[58] Field of Search ................................. 439/15, 164

[56] References Cited

U.S. PATENT DOCUMENTS

4,925,122  5/1990  Bannai .............................. 439/15 X
5,145,390  9/1992  Kaul .................................. 439/164

Primary Examiner—Eugene F. Desmond
Attorney, Agent, or Firm—Cushman, Darby & Cushman

[57] ABSTRACT

An electrical connector device includes first and second cable winding members one of which is co-rotatable with a rotatable side and the other of which is fixed to a stationary side. The first and second cable winding members are arranged with their respective centers being spaced apart from each other. An flexible cable is fixed at its one end to the first cable winding member and at its other end to the second cable winding member. The flexible cable is wound around the first winding member to form a loose winding of a plurality of turns therearound so that relative rotation between the first and second cable winding members is allowed by means of radially expanding and contracting behavior of the cable winding around the first cable winding member.

16 Claims, 7 Drawing Sheets

ELECTRICAL CONNECTOR DEVICE

BACKGROUND OF THE INVENTION

1. Field of the Invention

The present invention relates to an electrical connector device which provides electrical connection between relatively rotatable components, i.e. between components located on a rotatable side and a stationary side.

2. Description of the Prior Art

It has been known to use a slip-ring assembly for providing electrical connection between electrical devices arranged on a side of a rotary shaft and a stationary side, respectively. Specifically, a brush is fixedly provided on the stationary side and arranged to slide on a slip-ring which is fixedly provided along circumference of the rotary shaft, so as to maintain the electrical connection therebetween.

However, in this prior art, since the electrical connection is maintained by the mechanical sliding relationship between the slip-ring and the brush, short circuits due to metal powder caused by the sliding action therebetween as well as imperfect or defective contacts therebetween due to invasion of dust are likely to occur, which can not be effectively avoided. Accordingly, a problem has been raised on reliability particularly when it is used, such as, in a triggering circuit for an airbag provided in an automotive steering wheel, where a reliable transmission of a triggering current is extremely required.

In order to solve this problem, there has been proposed another type of the electrical connector device as disclosed in, such as, Japanese First (unexamined) Patent Publication No. 57-165982 which is equivalent to U.S. Pat. No. 4,502,746. In the electrical connector device of this type, an electrically conductive member is loosely wound around a rotary shaft with its one end fixed to the rotary shaft and with its other end fixed to a stationary side so as to ensure the electrical connection therebetween.

Figure 9A:
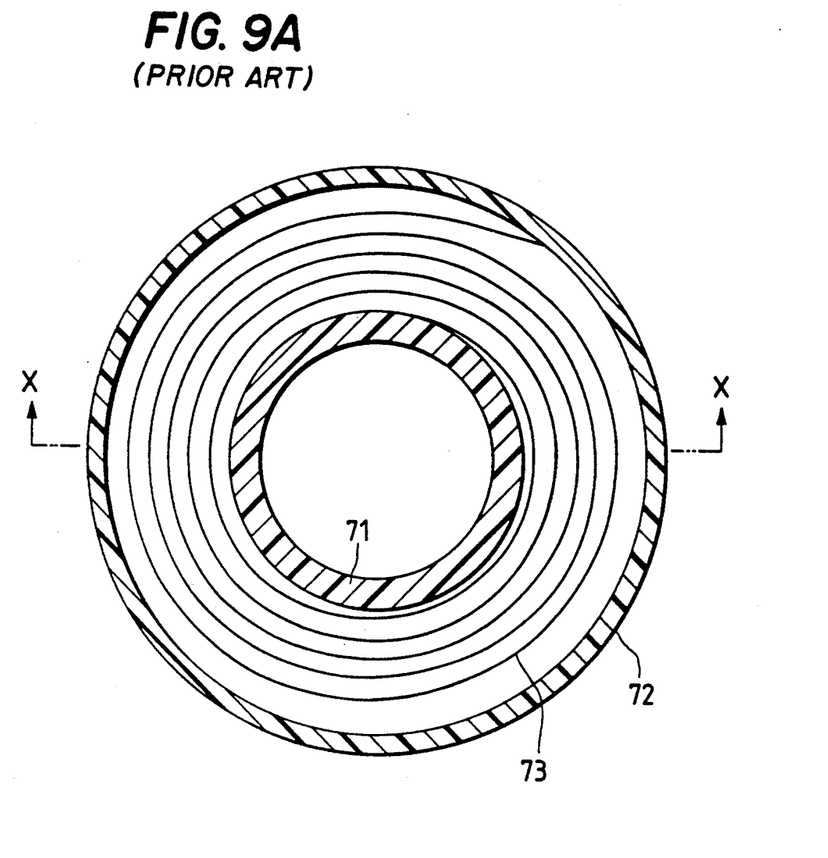
FIG. 9(A) is a transverse cross sectional view, corresponding to FIG. 2(A), showing an electrical connector device of the prior art.
Figure 9B:
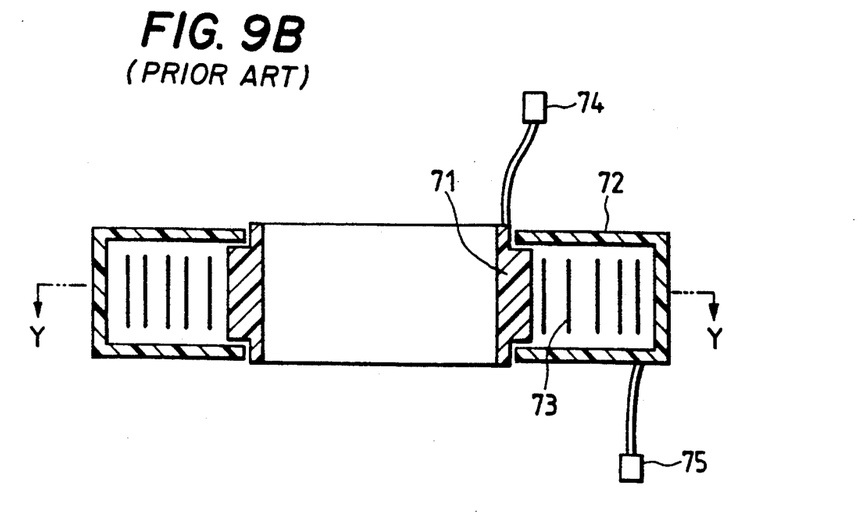
FIG. 9(B) is a vertical cross sectional view, corresponding to FIG. 2(B), showing the electrical connector device of FIG. 9(A).

FIG. 9 shows an electrical connector device similar to the latter prior art, for briefly explaining the concepts incorporated in the latter prior art. In FIG. 9, FIG. 9(A) shows a transverse cross section of the electrical connector device and FIG. 9(B) shows a vertical cross section thereof.

A stationary member 72 of an annular-cylindrical shape is provided surrounding a rotary shaft 71 to define an annular space therebetween. A flexible cable 73 is arranged in the annular space as being loosely wound around the rotary shaft 71. One end of the cable 73 is fixed to the rotary shaft 71 and electrically connected to a first terminal 74 for connection to an electric device arranged at a location for co-rotation with the rotary shaft 71. The other end of the cable 73 is fixed to the stationary member 72 and electrically connected to a second terminal 75 for connection to an electric device arranged on the side of the stationary member 72.

With this arrangement, when the rotary shaft 71 rotates in a counter-clockwise direction, the rotary shaft 71 pulls the cable 73 so that the cable winding is contracted onto the rotary shaft 71, while, when the rotary shaft 71 rotates in a clockwise direction, the rotary shaft 71 pushes the cable 73 so that the cable winding expands to be loosened. In this manner, the rotary shaft 71 is allowed to rotate within a limited number of revolutions or turns.

In this latter prior art, however, since an overall length of the cable 73 is determined depending on a diameter of the rotary shaft 71 and a required limited or maximum number of revolutions of the rotary shaft 71, when the diameter of the rotary shaft 71 increases, the length of the cable 73 as well as the size of the stationary member 72 which accommodates the cable 73 therein, inevitably increase, respectively.

SUMMARY OF THE INVENTION

Therefore, it is an object of the present invention to provide an improved electrical connector device that can eliminate the above-noted defects inherent in the prior art.

To accomplish the above-mentioned and other objects, according to one aspect of the present invention, an electrical connector device comprises a cable winding member; a first case supporting the cable winding member so as to allow relative rotation between the first case and the cable winding member; a second case having therein a cable winding core; and a flexible cable having one end fixed to the cable winding member and the other end fixed to the cable winding core, the flexible cable being wound around the cable winding core to form a loose winding of a plurality of turns therearound.

According to another aspect of the present invention, an electrical connector device comprises a first cable winding member; a second cable winding member, the first and second cable winding members being allowed relative rotation therebetween and arranged with their respective centers being spaced apart from each other; and a flexible cable having one end fixed to the first cable winding member and the other end fixed to the second cable winding member, the flexible cable being wound around the first cable winding member to form a loose winding of a plurality of turns therearound, whereby the relative rotation between the first and second cable winding members is allowed by means of radially expanding and contracting behavior of the cable winding around the first cable winding member.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Referring now to the drawings, first to sixth preferred embodiments of the present invention will be described with reference to FIGS. 1 to 8. Throughout the preferred embodiments, the same or like components are designated by the same reference numerals so as to substantially omit further explanation thereof for thus avoiding redundant disclosure.

Figure 1:
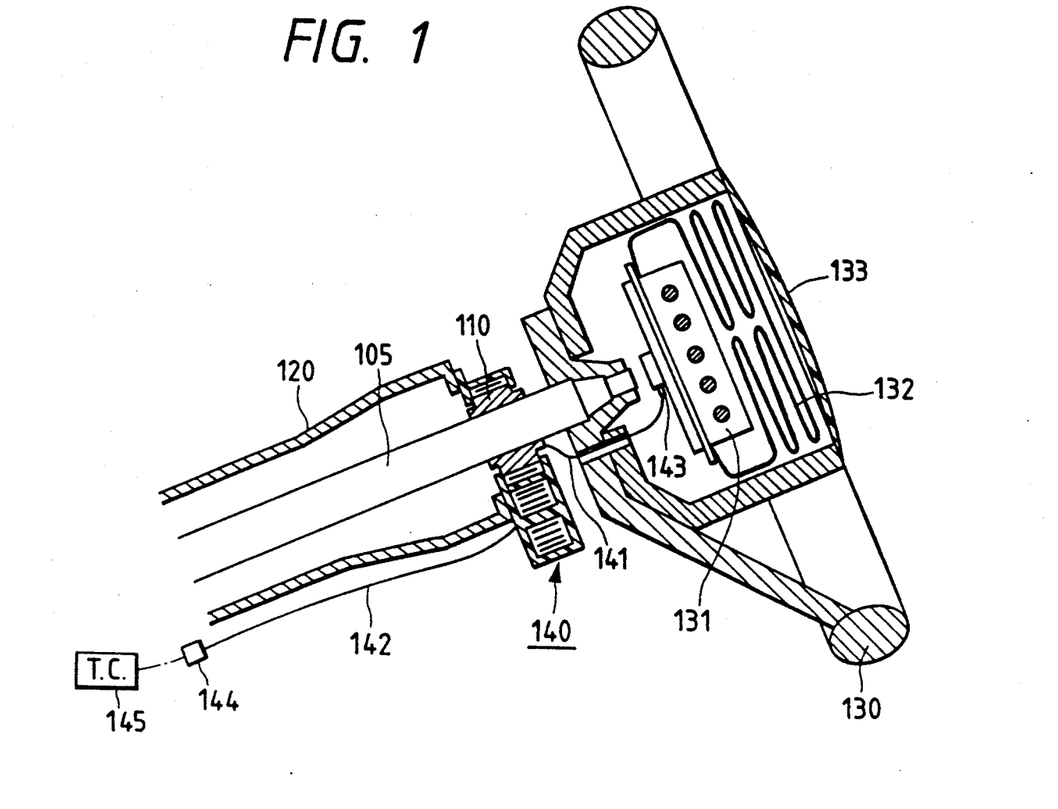
FIG. 1 is a schematic vertical cross sectional view showing a portion of a steering assembly of an automotive vehicle, wherein an electrical connector device according to a first preferred embodiment of the present invention is incorporated.
Figure 2A:
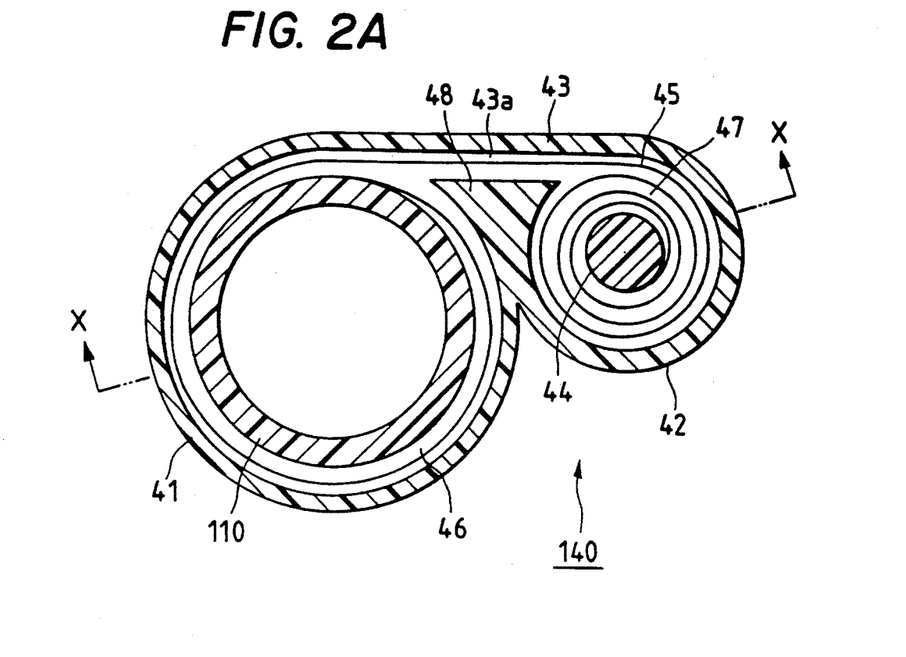
FIG. 2(A) is a horizontal or transverse cross sectional view taken along a line Y—Y in FIG. 2(B), showing the electrical connector device of the first preferred embodiment.
Figure 2B:
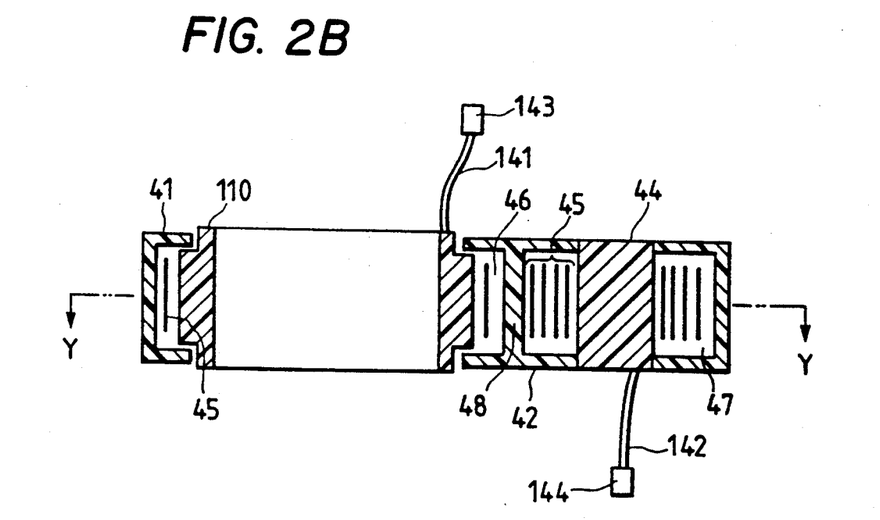
FIG. 2(B) is a vertical cross sectional view taken along a line X—X in FIG. 2(A)
Figure 3:
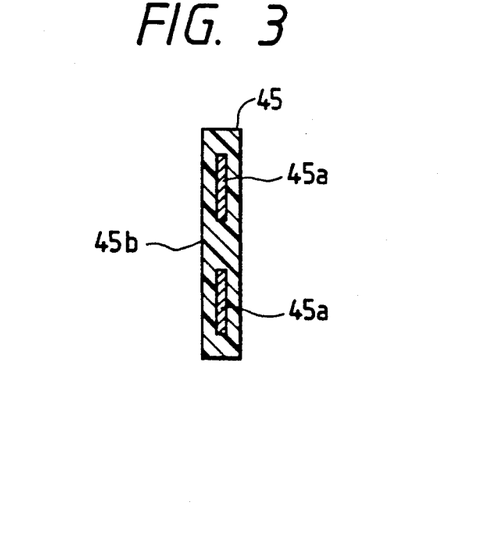
FIG. 3 is a cross sectional view showing structure of an example of an electric cable used in the first preferred embodiment.

FIGS. 1 to 3 show the first preferred embodiment of the present invention. In FIG. 1, an electrical connector device according to the first preferred embodiment and generally designated by a reference numeral 140 is shown as being incorporated in a steering assembly of an automotive vehicle.

A rotary shaft 105, i.e. a steering shaft in this embodiment, is received in a stationary casing 120 fixed to a vehicle body, i.e. a steering column jacket in this embodiment. At a rearward end of the rotary shaft 105, a steering wheel 130 is attached which includes at its center space an inflator 131 and an airbag 132. The space is closed by a pad 133.

The connector device 140 is provided between the stationary casing 120 and the rotary shaft 105 or the steering wheel 130 which is co-rotatable with the rotary shaft 105. A cable 141 which is extended out from the connector device 140 is connected via a first terminal 143 to the inflator 131 arranged on the side of the rotary shaft 105, meaning that the inflator 131 is co-rotatable with the rotary shaft 105. On the other hand, a cable 142 which is extended out from the connector device 140 is connected via a second terminal 144 to an impact detecting device or an inflator triggering circuit (T.C.) 145 arranged on the side of the stationary casing 120. The cables 141 and 142 are electrically connected to each other via the connector device 140. Accordingly, when an impact, caused by such as a vehicular collision, exceeding a predetermined level is detected by the impact detecting device or the T.C. 145, an inflator triggering signal is supplied to the inflator 131 via the cable 142, the connector device 140 and the cable 141, so as to cause the inflator to generate high pressure gas. Thus, the airbag 132 is inflated to be expanded out toward a vehicle driver to protect the driver.

FIG. 2 shows the structure of the connector device 140, wherein FIG. 2(A) shows a transverse cross section of the connector device 140 and FIG. 2(B) shows a vertical cross section thereof.

As shown in FIG. 2, the connector device 140 includes a cable winding member 110 of essentially a cylindrical shape, a first case 41 having a smooth inner circumferential surface and surrounding the cable winding member 110 to define an annular space 46 therebetween, a cable winding core 44 of essentially a cylindrical shape, a second case 42 having a smooth inner circumferential surface and surrounding the cable winding core 44 to define an annular space 47 therebetween, and a cable passage guide 43 defining therein a cable passage 43a. The cable passage 43a establishes communication between respective cable drawn-out openings of the first and second cases 41 and 42 or between the annular spaces 46 and 47. As shown in FIG. 1, the cable winding member 110 receives therethrough the rotary shaft 105 for co-rotation with the rotary shaft 105, while, the first and second cases 41 and 42 are fixed to the stationary casing 120. The cable winding core 44 is of a diameter considerably less than an outer diameter of the cable winding member 110 and is fixed to the second case 42 as clearly seen in FIG. 2(B).

As shown in FIG. 2(A), the first and second cases 41 and 42 and the cable passage guide 43 may be formed integral with each other, and the insides of the first and second cases 41 and 42, i.e. the annular spaces 46 and 47 may be separated by means of a partition 48.

The connector device 140 further includes a flexible cable 45 with its one end fixed to a portion of the outer periphery of the cable winding member 110 and with its other end fixed to a portion of the outer periphery of the cable winding core 44. Preferably, the cable 45 makes one turn around the cable winding member 110 in the annular space 46 and then extends through the cable passage 43a into the second case 42 when the steering wheel 130 is at its extreme position toward the clockwise direction. The cable 45 in the annular space 47 makes a plurality of turns to form a loose winding around the cable winding core 44, running in the clockwise direction and from a radially outer side to a radially inner side, and is finally fixed onto the circumference of the cable winding core 44.

The cable 141 is electrically connected to the cable 45 at the portion of the outer periphery of the cable winding member 110 where the one end of the cable 45 is fixed, and is extended out to the first terminal 143 as described before. Similarly, the cable 142 is electrically connected to the cable 45 at the portion of the outer periphery of the cable winding core 44 where the other end of the cable 45 is fixed, and is extended out to the second terminal 144 as also described before.

It may be arranged that the cable 45 is directly drawn out to the first and second terminals 143 and 144 from the respective cable winding member and core 110 and 44. The cable winding core 44 may be fixedly fitted to the second case 42 or integrally formed with the second case 42.

A radial distance between the outer periphery of the cable winding member 110 and the inner circumference of the first case 41, i.e. a width of the annual space 46, is set relatively small. This is effective for preventing the cable 45 wound around the cable winding member 110 from expanding radially within the annular space 46 when the cable winding member 110 rotates in an unwinding direction, so as to ensure that the cable 45 is securely returned or transferred into the second case 42. On the other hand, a radial distance between the outer periphery of the cable winding core 44 and the inner circumference of the second case 42, i.e. a width of the annular space 47, is set relatively large so as to allow radially expanding and contracting behavior of the cable winding around the cable winding core 44.

With this arrangement, when the steering wheel 130 is rotated in the counter-clockwise direction, the cable 45 is drawn out from the second case 42 through the cable passage 43a to be wound onto the cable winding member 110. On the other hand, when the steering wheel 130 is rotated in the clockwise direction, the cable 45 wound around the cable winding member 110 is loosened, but not expanded so much radially as described above, and is returned into the second case 42 via the cable passage 43a.

Since the diameter of the cable winding core 44 is set smaller than the outer diameter of the cable winding member 110, a size of the second case 42 may be made smaller and a length of the cable 45 may be reduced.

It may be arranged that the cable 45 is constantly urged or biased resiliently to be contracted to form a spiral winding around the cable winding core 44. This more facilitates the return of the cable 45 into the second case 42.

FIG. 3 shows a cross section of one example of the cable 45. The cable 45 comprises a pair of flat or plate-shaped electric conductors 45a, 45a which are coated with a plate-shaped insulator 45b made of synthetic resin. The number of the electric conductors is not limited to two. Further, the shape of each electric conductor 45a is not limited to the flat or plate shape. However, it may be advantageous for the electric conductor 45a to take such a shape in view of reducing an overall size of the connector device.

It may further be arranged that a shape of the inner wall of each of the first and second cases 41 and 42 is polygonal such as square in cross section, as opposed to the first preferred embodiment in which the shape thereof is essentially cylindrical or circular in cross section. Since this arrangement reduces a sliding area between the cable 45 and the corresponding inner wall, the return of the cable 45 into the second case 42 is more facilitated.

Figure 4A:
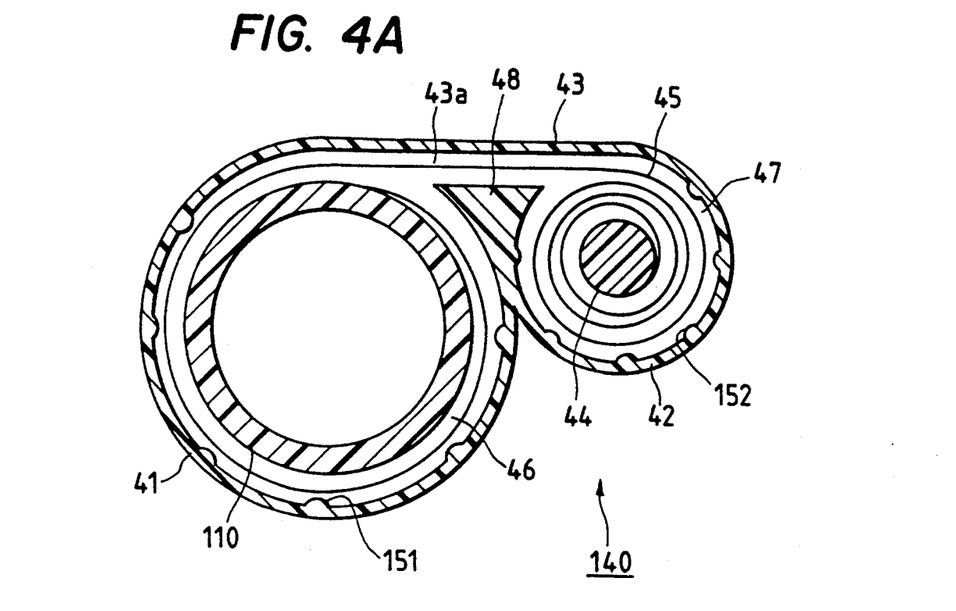
FIG. 4(A) is a transverse cross sectional view, corresponding to FIG. 2(A), showing an electrical connector device according to a second preferred embodiment of the present invention.
Figure 4B:
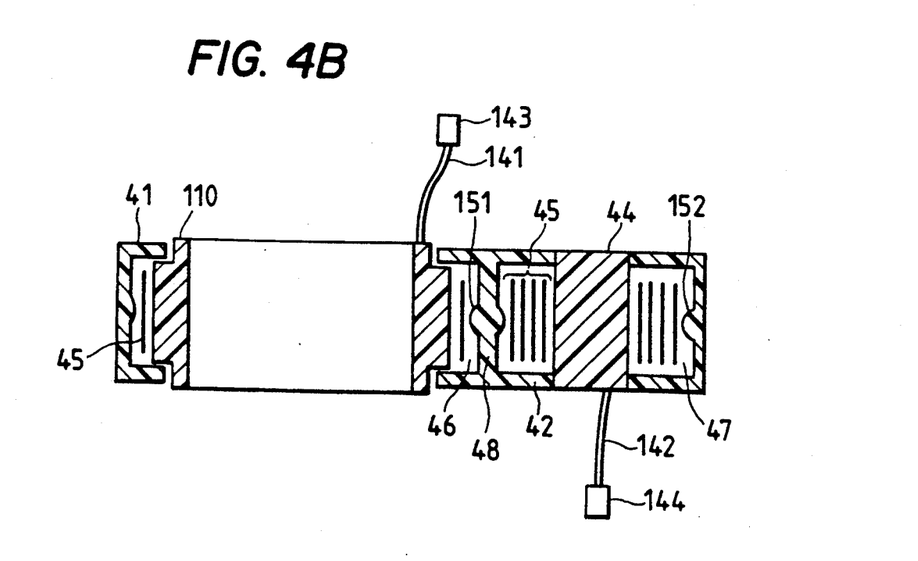
FIG. 4(B) is a vertical cross sectional view, corresponding to FIG. 2(B), showing the electrical connector device of FIG. 4(A)

FIG. 4 shows an electrical connector device 140 according to the second preferred embodiment of the present invention, wherein FIG. 4(A) shows a transverse cross section of the connector device 140 of the second preferred embodiment and FIG. 4(B) shows a vertical cross section thereof. The following explanation of the second preferred embodiment will refer to only what is modified from the first preferred embodiment, in view of avoiding the redundant disclosure.

In FIG. 4, a plurality of projections 151 and 152 are formed on the inner walls of the first and second cases 41 and 42, respectively. With this arrangement, since a sliding area between the cable 45 and each of the inner walls is reduced in comparison with that in the first preferred embodiment, the return of the cable 45 into the second case 42 is more facilitated.

Figure 5A:
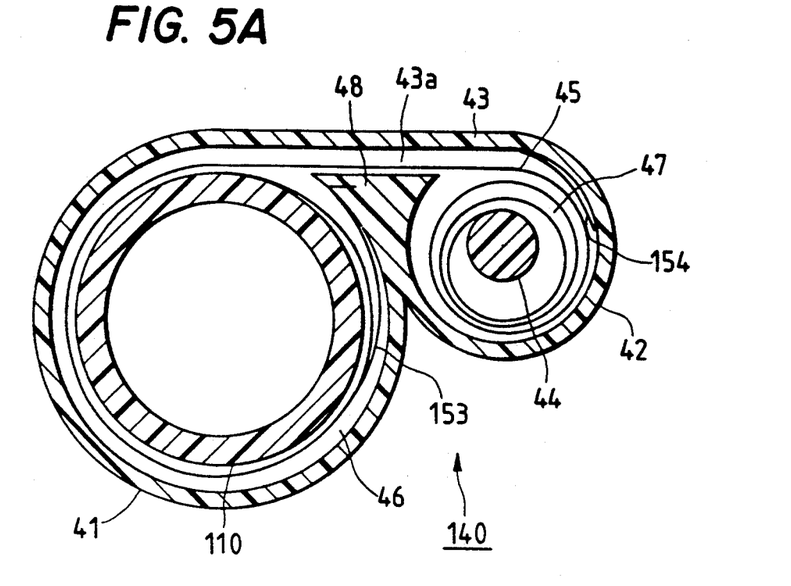
FIG. 5(A) is a transverse cross sectional view, corresponding to FIG. 2(A), showing an electrical connector device according to a third preferred embodiment of the present invention.
Figure 5B:
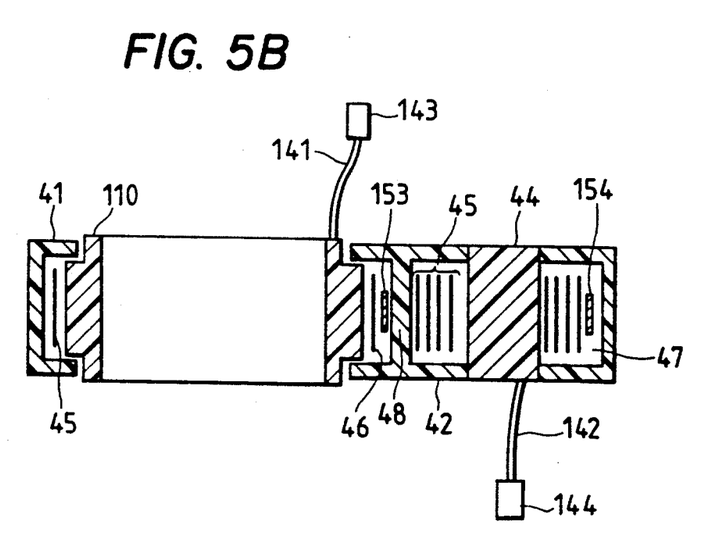
FIG. 5(B) is a vertical cross sectional view, corresponding to FIG. 2(B), showing the electrical connector device of FIG. 5(A)

FIG. 5 shows an electrical connector device 140 according to the third preferred embodiment of the present invention, wherein FIG. 5(A) shows a transverse cross section of the connector device 140 of the third preferred embodiment and FIG. 5(B) shows a vertical cross section thereof. The following explanation of the third preferred embodiment will refer to only what is modified from the first preferred embodiment, in view of avoiding the redundant disclosure.

In FIG. 5, elastic plates 153 and 154 are respectively provided in the first and second cases 41 and 42. Each elastic plate biases the cable 45 from a radially outer side toward a radially inner side, i.e. toward the cable winding member or core 110 or 44. This arrangement also reduces a sliding area between the cable 45 and each of the inner walls of the first and second cases 41 and 42 to more facilitate the return of the cable 45 into the second case 42.

Figure 6A:
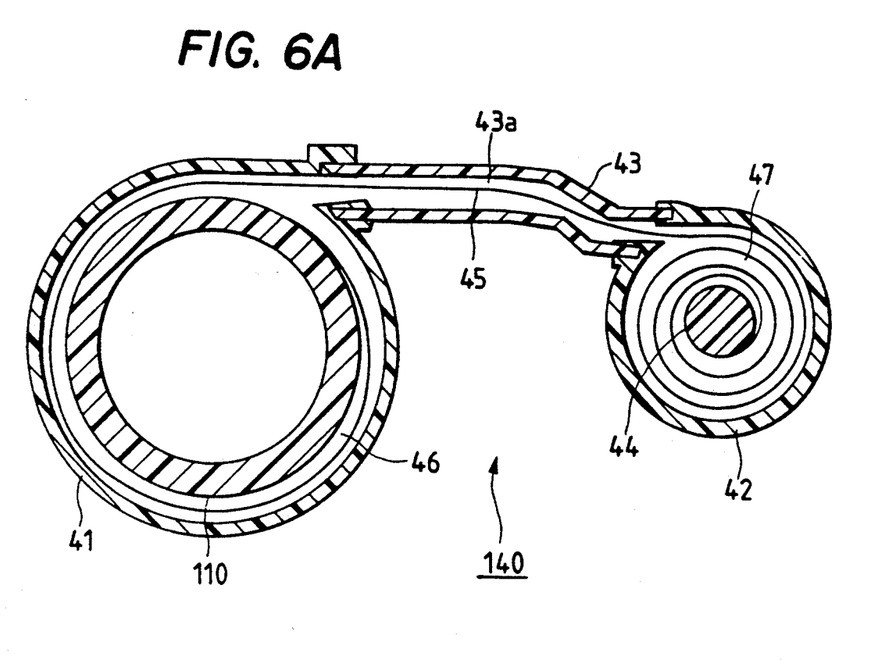
FIG. 6(A) is a transverse cross sectional view, corresponding to FIG. 2(A), showing an electrical connector device according to a fourth preferred embodiment of the present invention.
Figure 6B:
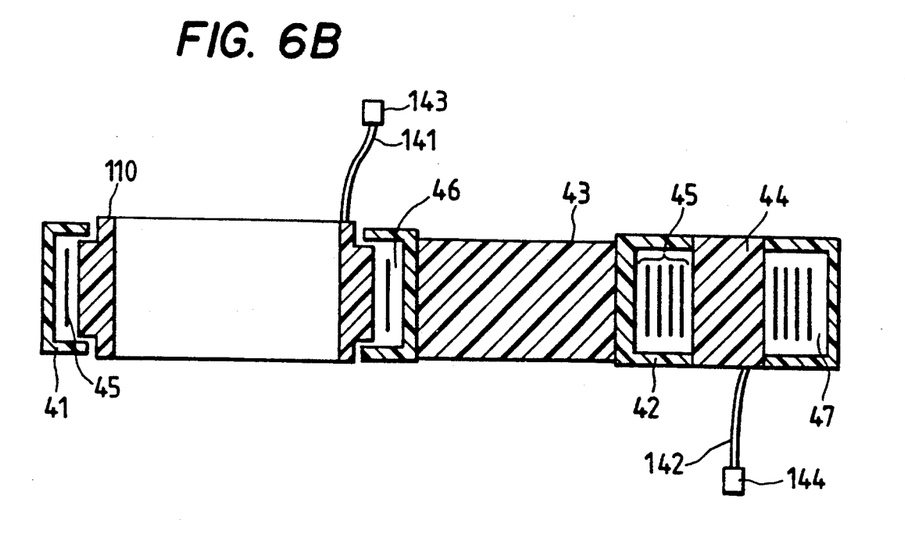
FIG. 6(B) is a vertical cross sectional view, corresponding to FIG. 2(B), showing the electrical connector device of FIG. 6(A)

FIG. 6 shows an electrical connector device 140 according to the fourth preferred embodiment of the present invention, wherein FIG. 6(A) shows a transverse cross section of the connector device 140 of the fourth preferred embodiment and FIG. 6(B) shows a vertical cross section thereof. The following explanation of the fourth preferred embodiment will refer to only what is modified from the first preferred embodiment, in view of avoiding the redundant disclosure.

In FIG. 6, the first case 41, the second case 42 and the cable passage guide 43 are formed separately from each other. The cable passage guide 43 may be made of a flexible material such as rubber. With this arrangement, by adjusting a length of the cable passage guide 43, the first and second cases 41 and 42 may be arranged separately at desired locations. This is particularly advantageous when there is no sufficient room available around the rotary shaft 105.

Further, it may be arranged to omit the cable passage guide 43 itself as long as the cable 45 can be extended between the first and second cases 41 and 42 with no interference against the displacement of the cable 45.

Figure 7:
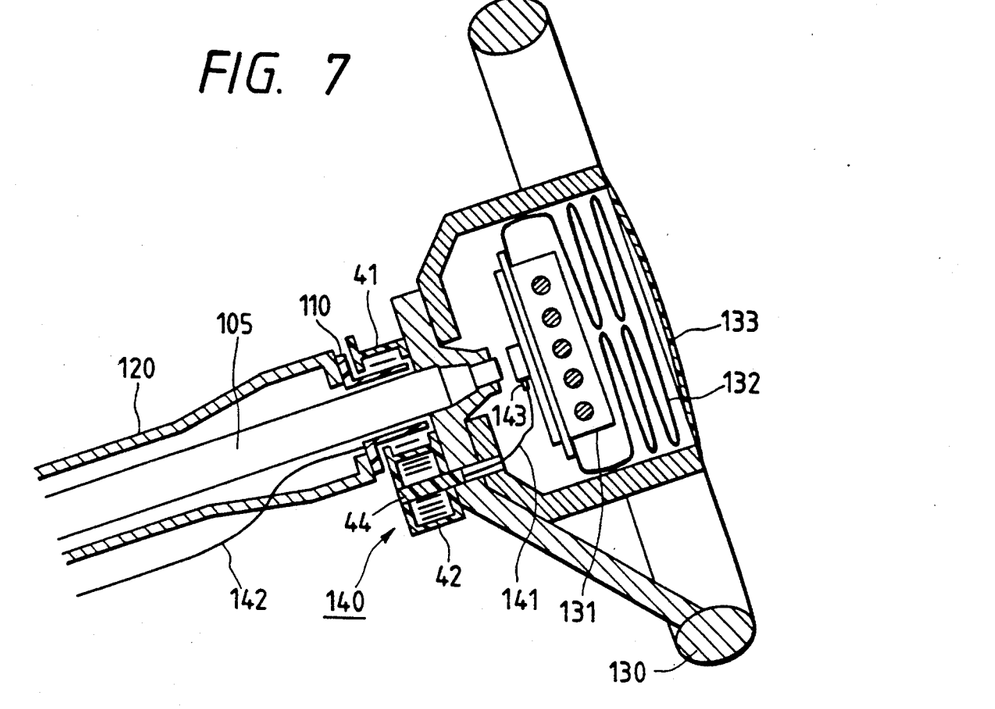
FIG. 7 is a schematic vertical cross sectional view showing a portion of a steering assembly of an automotive vehicle, wherein an electric connector device according to a fifth preferred embodiment of the present invention is incorporated.

FIG. 7 shows an electrical connector device 140 according to the fifth preferred embodiment of the present invention, as being incorporated in the automotive steering assembly as in the first to fourth preferred embodiments. The following explanation of the fifth preferred embodiment will refer to only what is modified from the first preferred embodiment, in view of avoiding the redundant disclosure.

In FIG. 7, the cable winding member 110 is fixed to the stationary casing 120, i.e. to the vehicle body, while, the first case 41 and the second case 42 with the cable winding core 44 fixed thereto are fixed on the side of the rotary shaft 105 or the steering wheel 130. Accordingly, the first and second cases 41 and 42 are co-rotatable with the steering wheel 130. Further, the cable 141 is extended out from the cable winding core 44, and the cable 142 is extended out from the cable winding member 110. This fifth preferred embodiment also works effectively as the first preferred embodiment.

Figure 8:
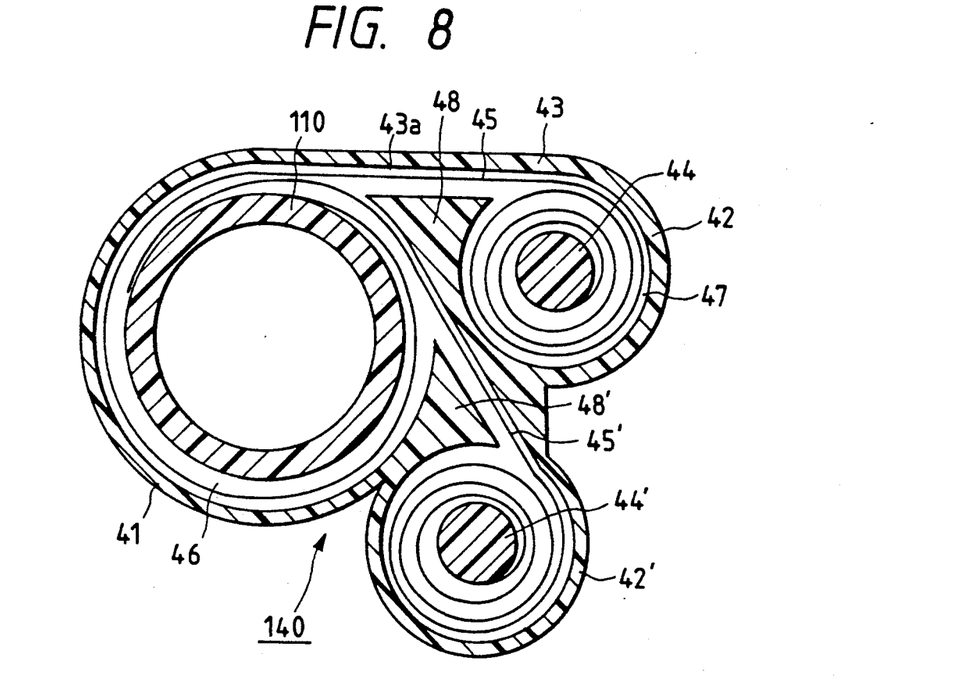
FIG. 8 is a transverse cross sectional view, corresponding to FIG. 2(A), showing an electrical connector device according to a sixth preferred embodiment of the present invention.

FIG. 8 shows an electrical connector device 140 according to the sixth preferred embodiment of the present invention. The following explanation of the sixth preferred embodiment will refer to only what is modified from the first preferred embodiment, in view of avoiding the redundant disclosure.

In FIG. 8, the connector device 140 further includes a third case 42' which is substantially of the same structure as the second case 42. Accordingly, a further cable 45' is provided as extending between the first case 41 and the third case 42' with its one end fixed to the outer periphery of the cable winding member 110 and with its other end fixed to the outer periphery of a further cable winding core 44'. With this arrangement, the number of the cables, i.e. the number of signal lines may be increased without increasing a height of the connector device 140. A fourth case or further cases may be provided in the similar manner.

It is to be understood that this invention is not to be limited to the preferred embodiments and modifications described above, and that various changes and modifications may be made without departing from the spirit and scope of the invention as defined in the appended claims.

What is claimed is:

1. An electrical connector device comprising:
a cable winding member;
a first case supporting said cable winding member so as to allow relative rotation between said first case and said cable winding member;
a second case having a cable winding core; and
a flexible cable having one end fixed to said cable winding member and the other end fixed to said cable winding core, said flexible cable being wound around the cable winding core to form a loose winding of a plurality of turns therearound,
wherein said cable winding member is provided around a rotary shaft of a vehicular steering wheel.

2. The electrical connector device as set forth in claim 1, wherein a diameter of said cable winding core is set smaller than that of the cable winding member.

3. The electrical connector device as set forth in claim 1, wherein said cable winding member is fixed to said rotary shaft, and said first case is fixed to a side of a vehicle body.

4. The electrical connector device as set forth in claim 1, wherein said cable winding member is fixed to a side of a vehicle body, and said first case is fixed to a side of the rotary shaft.

5. The electrical connector device as set forth in claim 1, wherein said cable winding member is electrically connected to a vehicular passenger protecting device provided in said steering wheel, and said cable winding core is electrically connected to a triggering circuit arranged to detect a vehicular collision and to activate said vehicular passenger protecting device, and wherein said vehicular passenger protecting device and said triggering circuit are electrically connected via said flexible cable.

6. The electrical connector device as set forth in claim 1, wherein a partition is provided between the first and second cases for separating insides of the first and second cases from each other.

7. The electrical connector device as set forth in claim 1, wherein said first case has an inner wall facing said cable winding member, and said second case has an inner wall facing said cable winding core, and wherein a plurality of projections are provided on at least one of said inner walls of the first and second cases.

8. The electrical connector device as set forth in claim 1, wherein an elastic plate is provided in at least one of the first and second cases for urging said flexible cable from a radially outer side toward a radially inner side.

9. The electrical connector device as set forth in claim 1, wherein said second case comprises a plurality of casing members each having said cable winding core therein, and wherein said flexible cable is provided for each of said casing members, each flexible cable having one end fixed to the corresponding cable winding core and the other end fixed to said cable winding member.

10. The electrical connector device as set forth in claim 1,
wherein a first annular space is defined between said cable winding member and said first case, said flexible cable being disposed in said first annular space, and a second annular space is defined between said cable winding core and said second case, said flexible cable being disposed in said second annular space, and
wherein a width of said first annular space is set smaller than that of said second annular space, the width of the first annular space being sufficiently small to limit radial expansion of the cable so that the cable is effectively transferred into said second annular space when said cable winding member makes said relative rotation in an unwinding direction of the flexible cable.

11. The electrical connector device as set forth in claim 10, wherein a width of said second annular space is set large enough to allow radially expanding and contracting behavior of said cable winding around the cable winding core.

12. An electrical connector device comprising:
a first cable winding member;
a second cable winding member;
said first and second cable winding members being allowed relative rotation therebetween and arranged with their respective centers being spaced apart from each other,
said second cable winding member provided around a rotary shaft of a vehicular steering wheel; and
a flexible cable having one end fixed to said first cable winding member and the other end fixed to said second cable winding member, said flexible cable being wound around said first cable winding member to form a loose winding of a plurality of turns therearound,
whereby said relative rotation between the first and second cable winding members is allowed by means of radially expanding and contracting behavior of said cable winding around said first cable winding member.

13. The electrical connector device as set forth in claim 12, wherein a diameter of said first cable winding member is set smaller than that of the second cable winding member.

14. The electrical connector device as set forth in claim 12, wherein said first cable winding member is fixed to a vehicle body, and said second cable winding member is fixed to a rotary shaft.

15. The electrical connector device as set forth in claim 12, wherein said first cable winding member is fixed to a rotary shaft, and said second cable winding member is fixed to a vehicle body.

16. The electrical connector device as set forth in claim 15, wherein said first cable winding member is rotatable about said second cable winding member.

* * * * *